United States Patent [19]

Uraneck et al.

[11] 3,855,188

[45] Dec. 17, 1974

[54] EMULSION POLYMERIZATION PROCESS UTILIZING ORGANOSULFUR MOLECULAR WEIGHT MODIFIER PREMIXED WITH EMULSIFIER AND REDUCING AGENT

[75] Inventors: Carl A. Uraneck; John E. Burleigh, both of Bartlesville, Okla.

[73] Assignee: Phillips Petroleum Company, Bartlesville, Okla.

[22] Filed: May 16, 1973

[21] Appl. No.: 360,968

[52] U.S. Cl. ......... 260/84.3, 260/84.7, 260/93.5 W, 260/94.4, 260/94.7, 260/880 R

[51] Int. Cl. .......................... C08f 1/13, C08f 19/08

[58] Field of Search ........... 260/84.3, 94.4, 93.5 W, 260/880 R

[56] References Cited

UNITED STATES PATENTS

| | | | |
|---|---|---|---|
| 2,494,326 | 1/1950 | Arundale | 260/84.3 |
| 2,715,115 | 8/1955 | Blanchette et al. | 260/84.3 |
| 2,706,192 | 4/1955 | Hoag | 268/93.5 W |
| 3,413,277 | 11/1968 | Crano et al. | 260/93.5 W |

*Primary Examiner*—James A. Seidleck

[57] ABSTRACT

Treating aqueous emulsifiers with a reducing agent prior to coagitation of the aqueous emulsifier with an organosulfur molecular weight regulator improves effectiveness and reduces loss of the organosulfur molecular weight modifier during coagitation.

20 Claims, No Drawings

EMULSION POLYMERIZATION PROCESS UTILIZING ORGANOSULFUR MOLECULAR WEIGHT MODIFIER PREMIXED WITH EMULSIFIER AND REDUCING AGENT

FIELD OF THE INVENTION

The invention relates to emulsion polymerization systems employing organosulfur compound molecular weight modifiers.

BACKGROUND OF THE INVENTION

Organosulfur compounds employed as molecular weight modifiers or regulators in emulsion polymerization systems have exhibited somewhat variable efficiencies. Higher molecular weight species, particularly of the mercaptan compounds, possess relatively low chain transfer effectiveness. Lower molecular weight species have higher volatilities which may contribute to residual odours in the polymers. Coagitating mixtures of the emulsifiers and organosulfur compounds prior to employment in the emulsion system has improved the reactivity of the modifiers, but may itself result in some loss of modifier.

Efficient effective use of the modifier has not been attainable, necessitating the use of undesirable amounts, or at least more than would otherwise be necessary, adding to the cost of the polymer and resulting in variations in product quality. It is certainly preferable for both economy and product quality with minimum residual odour to use minimum amounts of modifier consistent with effectiveness.

OBJECTS OF THE INVENTION

It is an object of the invention to improve the effectiveness of organosulfur compounds as molecular weight modifiers in emulsion polymerization systems.

Other aspects, objects and advantages of the invention will become apparent from the study of this disclosure including the appended claims.

BRIEF SUMMARY OF THE INVENTION

Treating aqueous emulsifiers with reducing agents prior to coagitating the emulsifier and the organosulfur molecular weight modifier substantially avoids untoward loss during coagitation. The coagitated admixture employed in an emulsion polymerization system exhibits improved effectiveness of the organosuflur compound as molecular weight modifier.

DETAILED DESCRIPTION OF THE INVENTION

Our invention applies to emulsion polymerization processes in which the control or modification of polymer molecular weight is effected by means of a chain transfer mechanism employing organosulfur compounds as the chain transfer agents or molecular weight regulators or modifiers. The emulsifier and the organosulfur compound are admixed and coagitated prior to their introduction into the balance of the polymerization admixture. This coagitation markedly increases the reactivity of the organosulfur compounds as modifiers.

In accordance with our invention, we have discovered that treating the aqueous emulsifier with a reducing agent prior to admixture with the modifier avoids or at least greatly reduces loss of or depletion of the organosulfur compound modifier during the coagitation step. After the emulsifier is so treated, the modifier is added, the combination coagitated, and the coagitated mixture then employed in an emulsion polymerization system. The inclusion of the reducing agent effectively limits or eliminates the partial loss of modifier otherwise tending to occur during the coagitation step.

REDUCING AGENTS

In general, any reducing agent is suitable which limits or prevents the loss of the organosulfur modifier during the coagitation step, but which itself does not interfere with the employment of the coagitated emulsifier/-modifier in the emulsion polymerization system.

The reducing agents include the sulfites, bisulfites, sulfides, dithionites or hydrosulfites, nitrites, hypophosphites and phosphites. Presently preferred are the inorganic reducing compounds of sulfur. The salts may be employed in the anhydrous or the various hydrated forms, or as the bisalts such as sodium hydrogen sulfide and the like. The compounds may be employed in admixture of two or more. The salts may be employed as the Group IA metal or ammonium salts, presently preferred is sodium. Nonlimiting examples of reducing agents include such as lithium bisulfite, sodium dithionite, potassium sulfide, rubidium sulfide, cesium hypophosphite, lithium orthophosphite and the like. In addition to these inorganic salts are numerous oxidizable nitrogen and oxygen compounds, both organic and inorganic. Examples include hydroxylamine, the hydrazines, and substituted hydrazines such as phenylhydrazine, hydroquinone, aldehydes such as formaldehyde, paraldehyde, alkyl nitriles such as n-butylnitrile, and the like, one or more, employed in amounts not sufficient to inhibit the desired emulsion polymerizations.

The amount of reducing agent employed can range widely, and need only be a minor effective amount to provide the desired stabilization. The amount depends to some extent on the effectiveness of the reducing agent itself, as well as upon the organosulfur modifier which is to be protected, as well as to some extent upon coagitation conditions such as temperature, pH of the coagitation medium, and the like. While the amount can vary widely, we suggest as expedient that the amount of reducing agent employed range from about 0.01 to 1 phm, preferably about 0.02 to 0.5 phm, parts of reducing agent by weight per 100 parts by weight of monomer.

MODIFIERS

Our invention is applicable to any organosulfur molecular weight modifier or regulator employed in an emulsion polymerization system. Types of organosulfur modifiers include the presently preferred mercaptans, as well as such as dialkyl dixanthogens, diaryl disulfides, tetraalkylthiuram mono- and disulfides, mercaptothiazoles and the like, alone or in admixture.

Most used commercially at present are the mercaptan compounds, and of these presently are preferred the hydrocarbyl mercaptans containing 8 to 20 carbon atoms per molecule, including straight and branched chain alkyl, similar alkenyl and alkadienyl, as well as cycloalkyl, cycloalkenyl, cycloalkadienyl, and aryl, and combinations such as alkaryl and aralkyl compounds. The more preferred mercaptan modifiers are those of tertiary alkyl configuration.

The amount of organosulfur modifier employed can vary widely, depending upon the particular compound or mixture chosen, the polymerization temperatures, the emulsifier and other recipe ingredients, and the extent of modification desired. Coagitation permits the option of employing higher molecular weight organosulfur compounds than might otherwise be employed in view of the capability of coagitation of modifier with emulsifier to raise *r* values. Satisfactory modification can be obtained by employing on the order of 0.01 to 5 phm parts organosulfur compound per 100 parts monomer by weight, with 0.05 to 2 phm presently being preferred, though greater or lesser amounts may be utilized where desired.

Suitable organosulfur compounds include n-octyl mercaptan, n-dodecyl mercaptan, t-nonyl mercaptan, t-dodecyl mercaptan, t-hexadecyl mercaptan, t-octadecyl mercaptan, t-eicosyl mercaptan, sec-octyl mercaptan, sec-tridecyl mercaptan, cyclododecyl mercaptan, cyclododecadienyl mercaptan; aryl mercaptans such as 1-naphthalenethiol, and the like; bis(tetrahydrofurfural xanthogen), diphenyl disulfide, tetramethyl thiuram disulfide, 2-mercaptobenzothiazole, and the like. Mixtures or blends of any of these organosulfur compounds can also be used. Commercially available and suitable organosulfur compound modifiers often are mixtures of organosulfur compounds, e.g., mixtures of t-dodecyl, t-tetradecyl, and t-hexadecyl mercaptans.

EMULSIFYING AGENTS

A wide variety of emulsifying agents can be employed, including rosin acid soaps, disproportionated rosin acid soaps, fatty acid soaps, mixtures of disproportionated rosin acid soaps with fatty acid soaps, alkaryl sulfonates, and other surface-active materials and mixtures thereof. Nonionic emulsifiers also can be employed including polyethers and polyols.

Amounts of emulsifying agent employed depend on the type and reaction parameters and monomer concentrations. An expedient range would be about 0.5 to 10 phm, parts by weight per 100 parts of monomer. The relative amounts of emulsifier:modifier can range widely depending on monomers, species, reaction parameters, degree of modification desired, and the like. An expedient range would be about 250:1 to 1:1 weight ratio of emulsifier:modifier, although operability outside of this range is feasible.

Aqueous medium normally is employed with the emulsifier, though other components such as one or more of the lower alcohols or glycols may be added for lower temperature polymerizations when desired. The amount of water or water and alcohol or a glycol employed is a matter of convenience as to amounts of materials to handle and is not limiting as far as making the coagitated admixture of emulsifier:modifier is concerned. Supplemental water for the emulsion polymerization process itself can be readily later added at that stage.

COAGITATION

The aqueous solution of the emulsifier and the organosulfur compound are admixed and coagitated prior to their introduction into the balance of the polymerization mixture. This coagitation markedly increases the reactivity of the organosulfur compounds as modifiers. The effect of coagitation is particularly advantageous in cases where the value of the regulating index is less than about 4 under conditions of a standard commercial polymerization rate for SBR-type systems. Cf. Uraneck, C. A., and Burleigh, J. E., 19 *Kautschuk und Gummi Kunststoffe*, 532–542 (1966).

The increase in reactivity of a modifier can be interpreted quantitatively as an increase in the regulating index as measured by the rate of depletion of the modifier. The regulating index, *r*, is defined as $$r = -d(\ln S)/dX$$

wherein S represents the concentration of organosulfur compound and X the fractional conversion. Coagitation of the mixture of modifier and emulsifier affords a range of *r* values within limits based on the reactivity of the organosulfur compound and the intensity and duration of agitation.

The coagitation employed is the strong and thorough admixing of the organosulfur compound modifier or regulator with at least a portion of the emulsifier, preferably as an aqueous emulsifier, i.e., emulsifier-water solution, in such manner as to afford significant reduction in the particle size of the organosulfur compound. The amount or degree as well as duration of mixing is that which is sufficient to effectuate the extent of improvement in regulating index desired.

Coagitation of modifier and emulsifier is distinguished from the ordinary preemulsification mixing which may be conducted as the complete polymerization mixture is tumbled or otherwise agitated when being brought to the desired polymerization temperature. Coagitation takes place prior to the preemulsification step.

Coagitation of organosulfur modifier and emulsifier may be accomplished by any suitable means including tumbling action, stirring, shearing action, application of high-frequency vibrations, or the like. The optimum time interval for a desired degree of agitation depends on the efficiency of the equipment used and the particular components and modifiers employed. The frequency and force of collision and the wave frequency, intensity, and absorbing capacity of the ultrasonic milled components all may vary with the time employed. More vigorous operations require reduced time, e.g., effective agitation can occur with tumbling in about 70 to 100 hours, with ultrasonic vibration in 1 to 2 hours, and with high speed shearing action in less than one hour. The coagitation process is carried out under an inert atmosphere, e.g., nitrogen.

INITIATORS

Free-radical initiators useful in the emulsion polymerization process include any of the broad groups of compounds utilized for the purpose in emulsion polymerization systems, including redox initiator systems such as ferrous sulfate/hydrogen peroxide, potassium persulfate/sodium bisulfite, and the like, and more particularly the free-radical initiators classed as the monomer-soluble organoperoxides, organohydroperoxides, and azo compounds. Amounts expediently employed are of the order of about 0.01 to 5 phm, more preferred about 0.03 to 1 phm.

Exemplary catalysts include di-t-butylperoxide, benzoyl peroxide, lauroyl peroxide, t-butyl peracetate, t-butyl perbenzoate, dicumyl peroxide, 2,5-dimethyl-2,5-di(t-butylperoxy)hexane, t-butyl hydroperoxide, cumene hydroperoxide, p-menthane hydroperoxide, cyclopentane hydroperoxide, diisopropylbenzene hydroperoxide, p-t-butylcumene hydroperoxide, pinene hydroperoxide, 2,2′-azobis(2-methylpropionitrile), and the like, and mixtures thereof.

MONOMERS

Monomers employed in the process of our invention include any polymerizable with a redox system or with free-radical initiators in emulsion polymerization processes, such as polymerizable conjugated dienes, monovinyl-substituted aromatic compounds, or both both, either with other copolymerizable unsaturated monomers.

The polymerizable conjugated dienes commonly employed include those containing 4 to 12, preferably for commercial availability and reactivity 4 to 8 carbon atoms per molecule, such as 1,3-butadiene, isoprene, chloroprene, piperylene, 2-methyl-1,3-pentadiene, 2,3-dimethyl-1,3-butadiene, 1,3-octadiene, 5,6-diethyl-1,3-octadiene, and the like. The conjugated dienes can be polymerized to form homopolymers or copolymers of two or more.

Polymers of conjugated dienes include copolymers formed by polymerizing one or more polymerizable conjugated dienes with one or more copolymerizable monomers. These include monovinyl-substituted or propenyl-substituted aromatic compounds, such as those of 8 to 20, more particularly for commercial availability and reactivity 8 to 12 carbon atoms per molecule, including styrene, various of the alkylstyrenes such as p-methylstyrene, 1-propenylbenzene or beta-methylstyrene, halostyrenes such as 2,3-dichlorostyrene; as well as other copolymerizable ethylenically unsaturated monomers including the nitriles such as acrylonitrile or methacrylonitrile, esters of acrylic and methacrylic acid, e.g., ethyl acrylate and methylmethacrylate, vinyl esters such as vinyl acetate, other vinyl compounds such as the vinyl halides such as vinyl chloride; and the like.

The process of our invention also is useful in the preparation of SAN type resins, i.e., copolymers of styrene or substituted styrenes with the vinyl nitriles. Substituted styrenes include those of 8 to 20 carbon atoms per molecule such as alpha-methylstyrene, ortho-, meta-, or p-alkyl aromatic substituted styrenes; o-, m-, or p-halogenated styrenes wherein the halogen can be any of fluorine, chlorine, bromine, or iodine; and the vinyl nitriles include those of 3 to 12 carbon atoms per molecule such as acrylonitrile, methacrylonitrile, and the like, all as prepared in emulsion systems modified with organosulfur molecular weight modifiers. The coagitated modifiers are useful in preparing copolymers of styrene and acrylate including any of the esters of acrylic and methacrylic acid such as methyl, ethyl, butyl, acrylates and methacrylates. Latexes of these latter copolymers are particularly suitable for latex base paints.

A further class of polymers made in emulsion systems which can benefit from the process of our invention of employing coagitated modifiers are the ABS compositions made by the emulsion process. In the ABS process, an emulsion or latex of an unsaturated elastomer is first prepared, or the elastomer can be dissolved in polymerizable monomers and the resulting solution emulsified, and polymerizable monomer or various combinations of monomers such as the styrenes, vinylnitriles, acrylates, then are co- or terpolymerized in the presence of the elastomeric dispersion.

POLYMERIZATION CONDITIONS

Polymerization conditions of temperature, time, pressure, and the like can range widely, depending upon particular materials and reactor conditions desired or convenient to employ, the monomers involved, relative volatility thereof, amounts of water, and equipment involved.

Polymerization commonly is carried out by continuously agitating the polymerization emulsion at polymerization temperatures expediently in the range of about −40° to +100° C., preferably about 0° to 50° C. The pH range can vary widely such as about 1 to 12, presently preferably about 7 to 10.8.

After the degree or extent of polymerization desired has been accomplished, the polymerization reaction can be terminated with a shortstop. An antioxidant also usually is added to protect the polymer. The emulsion process results in a latex from which the polymer can be recovered by a process known as creaming, i.e., the addition of an aqueous salt solution such as sodium chloride solution, and coagulation of the polymeric product by the addition of a dilute mineral acid such as sulfuric acid. The product then is collected by filtration, washed, dried in conventional drying equipment.

EXAMPLES

The following examples are intended to further illustrate our invention. In these runs both the coagitation and the polymerization steps are carried out under an inert atmosphere, e.g., nitrogen. Particular species employed, particular conditions, particular amounts used in the examples, are intended to be illustrative and not limitative of the reasonable and proper scope of our invention. For the purposes of illustrating the invention, it was unnecessary to recover the product mixture after polymerization. Data in the following examples illustrate the beneficial effects of reducing agents used according to our invention for the conservation of the organosulfur modifier during the coagitation step.

EXAMPLE I

Run 1 is a control run in that a reducing agent is not employed. The run was made in accordance with the following recipe.

Recipe: SBR 1503

| Emulsifier Solution | Parts by Weight |
|---|---|
| Potassium fatty acid soap | 4.6 |
| KOH | 0.03 |
| KCl | 0.3 |
| Sodium alkylnaphthalene sulfonate | 0.2 |
| Water | 170 |
| Modifier | |
| t-Hexadecyl mercaptan | 0.434 |
| Monomers | |
| Butadiene | 70 |
| Styrene | 30 |
| Initiator | |
| p-Menthane hydroperoxide | 0.063 |
| Activator Solution | |
| Tetrahydrate of the tetrasodium salt of ethylenediamine tetraacetic acid | 0.032 |
| $FeSO_4 7H_2O$ | 0.01 |
| $NaSO_2CH_2OH.2H_2O$ | 0.05 |
| Water | 10 |
| Polymerization Time, hours | variable |
| Polymerization Temp., °C. | 5 |

The mixture that was coagitated consisted of the potassium fatty acid soap solution and the mercaptan without the KCl and sodium alkylnaphthalene sulfonate. The coagitation was carried out, under a nitrogen atmosphere, in a Waring Blendor Model EP–1 for 40 minutes at 125° F. initial temperature to 200° F. final temperature.

The polymerization recipe charge order to the reactor was: (1) preagitated mixture described above in conjunction with the balance of the soap solution; (2) monomers; (3) oxidant; (4) activator solution. The polymerization, like the preagitation, was carried out under a nitrogen atmosphere. The depletion of the mercaptan was followed by periodic sampling and analysis according to the method of Kolthoff, I. M., and Harris, W. E., 2 *J. Poly. Sci.*, 49 (1947). The percentage conversion values were obtained by simply determining, through volatilizations, the increase in weight over the amount accounted for by the nonpolymeric solids present (emulsifier, salts and the like).

Run 2, a run of the invention in that a reducing agent was present in the mixture that was preagitated, utilized the recipe shown for Run 1 but employed 0.556 rather than 0.434 phm mercaptan plus 0.106 part of anhydrous sodium dithionite $Na_2S_2O_4$. The mixture to be preagitated was made up by adding the sodium dithionite in solid form to a boiling aqueous solution of (only) the fatty acid potassium salt. The resulting solution, under nitrogen atmosphere, was cooled to room temperature and the mercaptan modifier then was added. The resulting mixture was coagitated under nitrogen atmosphere in a Waring Blendor Model EP–1 for 40 minutes at 75° F. initial temperature to 205° F. final temperature. The charge order and analyses were as described for Run 1.

The data obtained for Run 2 of the invention are shown below in Table I in contrast to comparable data from control Run 1.

TABLE I

| Operation | Elapsed Time Hrs. | Residual Mercaptan Wt. % | | Conversion % | |
|---|---|---|---|---|---|
| | | Run 1 | Run 2 | Run 1 | Run 2 |
| Preemulsification[a] | 0.0 | 77[b] | 96[b] | NA[c] | NA |
| | 0.25 | 75 | 91 | NA | NA |
| | 0.4 | 74 | 98[d] | NA | NA |
| Polymerization | 0.1 | 48 | 45 | 1.5 | 1.5 |
| | 0.3 | 39 | 35 | 5 | 5 |
| | 1.8 | 24 | 25 | 26.5 | 27 |
| | 2.8 | 19 | 22 | 39.5 | 41 |
| | 3.7 | 18 | 19 | 50.5 | 51.5 |

[a] Preemulsification is the mixing occurring during temperature adjustment prior to initiation of the polymerization.
[b] Operation of inventive process is seen in comparing these two values, control Run 1 exhibiting a 23 per cent mercaptan loss versus 4 per cent for inventive Run 2.
[c] NA = Not Applicable.
[d] Anamalous values are believed attributable to difficulties in obtaining analytical samples from a heterogeneous system.

The operation of the inventive process and its value are seen in the first line of Table I. The respective residual mercaptan values show the very marked conservation that is afforded by the inventive process. In the comparative runs summarized above, a main point to observe is the beneficial effect of the reducing agent on the conservation of the modifier during the preagitation step. To demonstrate that the inventive process does not interfere with the emulsion polymerization itself, analytical data are included showing the progress of the polymerizations in control and in inventive runs.

The polymers made in accordance with the process of this invention can be compounded with stabilizers, antioxidants, fillers, pigments, reinforcing agents and other such additives as may be required for various and sundry applications. The polymeric products can be employed in the fabrication of tires, belts, gaskets, shoe soles, tubing and the like.

Reasonable variations and modifications of the process of our invention are possible without departing from the scope and spirit of our disclosure as set forth in the specification hereinabove and the claims hereinafter.

We claim:

1. In a process of aqueous emulsion polymerization wherein at least one polymerizable monomer polymerizable with a redox or free radical initiator is polymerized under aqueous emulsion polymerization conditions in the presence of a redox or free radical initiator, aqueous emulsifier solution, organosulfur compound as molecular weight modifier, and aqueous medium, the steps comprising:

treating said aqueous emulsifier solution by admixing therewith with at least one reducing agent, admixing said treated aqueous emulsifier with said organosulfur molecular weight compound modifier, coagitating the resulting admixture sufficiently to increase the reactivity of said organosulfur compound as said modifier, admixing said coagitated admixture of treated aqueous emulsifier and organosulfur molecular weight modifier with said polymerizable monomer and initiator and polymerizing the resulting polymerization admixture nder aqueous emulsion polymerization conditions, under wherein said polymerizable monomer is a polymerizable conjugated diene, polymerizable monovinyl-substituted aromatic compound, or both, and can further include copolymerizable monoethylenically unsaturated materials, and said polymerization can include the presence of an unsaturated elastomer, wherein said reducing agent is hydroxylamine, hydrazine, a substituted hydrazine, hydroquinone, aldehyde, paraldehyde, alkyl nitrile, or a Group IA alkali metal or ammonium sulfide, sulfite, dithionite, nitrite, hypophosphite, orthophosphite, or mixture, and wherein said reducing agent is employed in a minor amount effective to substantially prevent loss of said organosulfur compound molecular weight modifier during said coagitation;

wherein said emulsifier in said aqueous emulsifier solution is a nonionic or anionic emulsifier; and wherein said organosulfur compound molecular weight modifier is a mercaptan, dialkyldixanthogen, diaryldisulfide, tetraalkylthiuram monosulfide, tetraalkylthiuram disulfide, or mercaptothiazol.

2. The process according to claim 1 wherein said reducing agent is said Group IA alkali metal or ammonium sulfite, sulfide, dithionite, nitrite, hypophosphite, orthophosphite, or admixture, and wherein said Group IA metal is lithium, sodium, potassium, rubidium, or cesium.

3. The process according to claim 1 wherein is employed from about 0.01 to 1 phm of said reducing agent.

4. The process according to claim 3 wherein said copolymerizable monoethylenically unsaturated monomer is propenyl-substituted aromatic compound, ethylenically unsaturated nitrile, ester of acrylic acid, ester of methacrylic acid, vinyl ester, vinyl halide.

5. The process according to claim 3 wherein said initiator is a free radical initiator and is a redox couple peroxide, hydroperoxide, or azo compound.

6. The process according to claim 5 wherein the emulsifier in said aqueous emulsifier solution is at least one of a rosin acid soap, disproportionated rosin soap, fatty acid soap, alkarylsulfonate, nonionic emulsifier, or mixture.

7. The process according to claim 6 wherein said aqueous emulsion polymerization process employs 0.01 to 5 parts of said organosulfur compound as said molecular weight modifier per 100 parts monomer by weight, about 0.01 to 5 phm of said free radical initiator, and sufficient emulsifier to provide about 0.5 to 10 phm.

8. The process according to claim 6 wherein said organosulfur molecular weight modifier is a tertiary alkyl mercaptan of 8 to 20 carbon atoms per molecule.

9. The process according to claim 7 wherein said aqueous emulsion polymerization conditions include a polymerization temperature of about −40° C. to +100° C., at a pH in the range of about 1 to 12.

10. The process according to claim 9 wherein said polymerizable monomer is butadiene, styrene, or both.

11. The process according to claim 10 wherein said reducing agent is an inorganic reducing sulfur compound and is said Group IA or ammonium sulfite, sulfide, or dithionite.

12. The process according to claim 11 wherein said organosulfur molecular weight modifier is t-hexadecyl mercaptan.

13. The process according to claim 11 wherein is employed a butadiene/styrene ratio of about 70/30.

14. The process according to claim 11 wherein said reducing agent is sodium dithionite.

15. The process according to claim 3 wherein said organosulfur molecular weight compound modifier is n-octyl mercaptan, n-dodecyl mercaptan, t-nonyl mercaptan, t-dodecyl mercaptan, t-hexadecyl mercaptan, t-octadecyl mercaptan, t-eicosyl mercaptan, sec-octyl mercaptan, sec-tridecyl mercaptan, cyclododecyl mercaptan, cyclododecadienyl mercaptan; aryl mercaptans such as 1-naphthalenethiol; bis(tetrahydrofurfural xanthogen), diphenyl disulfide, tetramethyl thiuram disulfide, or 2-mercaptobenzothiazole.

16. The process according to claim 6 wherein said emulsifier in said aqueous emulsifier solution is a nonionic emulsifier and is a polyether or polyol.

17. The process according to claim 3 wherein said organosulfur molecular weight compound modifier is a mercaptan, and is a hydrocarbyl mercaptan containing 8 to 20 carbon atoms per molecule wherein the hydrocarbyl proportion thereof is a straight or branched chain alkyl, alkenyl, alkadienyl, cycloalkyl, cycloalkenyl, cycloalkadienyl, aryl, or combination.

18. The process according to claim 5 wherein said initiator system is selected from the group consisting of ferrous sulfate/hydrogen peroxide and potassium persulfate/sodium bisulfite.

19. The process according to claim 1 wherein said initiator system is selected from the group consisting of di-t-butylperoxide, benzoyl peroxide, lauroyl peroxide, t-butyl peracetate, t-butyl perbenzoate, dicumyl peroxide, 2,5-dimethyl-2,5-di(t-butylperoxy)hexane, t-butyl hydroperoxide, cumene hydroperoxide, p-menthane hydroperoxide, cyclopentane hydroperoxide, diisopropylbenzene hydroperoxide, p-t-butylcumene hydroperoxide, pinene hydroperoxide, and 2,2′-azobis(2-methylpropionitrile).

20. The process according to claim 3 wherein said polymerizable monomer is a polymerizable conjugated diene of 4 to 12 carbon atoms per molecule, a polymerizable monovinyl-substituted aromatic compound of 8 to 20 carbon atoms per molecule, or polymerizable propenyl-substituted aromatic compound of 8 to 20 carbon atoms per molecule.

* * * * *